US008839105B2

(12) United States Patent
Banerjee et al.

(10) Patent No.: US 8,839,105 B2
(45) Date of Patent: Sep. 16, 2014

(54) MULTI-DISPLAY SYSTEM AND METHOD SUPPORTING DIFFERING ACCESIBILITY FEATURE SELECTION

(75) Inventors: Dwip N. Banerjee, Austin, TX (US);
Ranadip Das, Kolkata (IN); Sandeep Ramesh Patil, Pune (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1700 days.

(21) Appl. No.: 11/565,678

(22) Filed: Dec. 1, 2006

(65) Prior Publication Data
US 2008/0134061 A1 Jun. 5, 2008

(51) Int. Cl.
*G06F 3/048* (2013.01)
(52) U.S. Cl.
USPC ........... 715/700; 715/764; 715/717; 715/867; 345/1.1
(58) Field of Classification Search
USPC ................ 715/717, 751, 730, 700, 764, 867; 345/1.1, 3.1
See application file for complete search history.

(56) References Cited

U.S. PATENT DOCUMENTS

| 6,917,362 | B2 * | 7/2005 | Pinedo et al. | 345/530 |
|---|---|---|---|---|
| 7,312,764 | B2 * | 12/2007 | Driver et al. | 345/1.1 |
| 7,466,290 | B2 * | 12/2008 | Driver et al. | 345/1.1 |
| 2004/0095292 | A1 * | 5/2004 | Ogura | 345/1.1 |
| 2005/0262575 | A1 * | 11/2005 | Dweck et al. | 726/28 |
| 2006/0168532 | A1 * | 7/2006 | Stevens et al. | 715/753 |
| 2007/0218432 | A1 * | 9/2007 | Glass et al. | 434/156 |

* cited by examiner

*Primary Examiner* — Ting Lee
(74) *Attorney, Agent, or Firm* — Mitch Harris, Atty at Law, LLC; Andrew M. Harris; Matthew W. Baca

(57) ABSTRACT

A multi-display system and method supporting differing accessibility feature selection provides a suitable display for a user with limited visual acuity, while providing a second display having a different accessibility feature set to a second user. An application or operating system checks selected accessibility features and display settings corresponding to each graphical display device and generates multiple graphical outputs in conformity with program output and the corresponding accessibility features and display settings for each device. One graphical display may be a personal computer display and the other a projector, so that an accessible desktop can be presented to the presenter, while the presentation can be shown with a desired set of attributes. The operating system may support the above-described operation by generating the multiple display outputs from the accessibility settings and a single program output. Alternatively, an application can generate two display outputs in conformity with accessibility selections.

20 Claims, 4 Drawing Sheets

MULTI-DISPLAY SYSTEM AND METHOD SUPPORTING DIFFERING ACCESIBILITY FEATURE SELECTION

BACKGROUND OF THE INVENTION

1. Technical Field

The present invention relates generally to computer systems with multiple graphical displays, and more particularly, to a multi-display system and method supporting differing accessibility features for each graphical display of a computer system.

2. Description of the Related Art

Multi-monitor support is included in most present-day operating systems and the use of multiple monitors across a single computer "desktop" is becoming increasingly prevalent. Accessibility features with respect to a computer graphical display, an in particular to present-day computer display "desktops" include features such as contrast, color set, font size, line widths and other visual display characteristics that can provide enhanced visibility for persons with some level of visual impairment. For example, a person with a particular form of color blindness can adjust their desktop settings to select a particular color scheme that uses colors that they are able to distinguish. As another example, a person with partial blindness can select large fonts for the display of text.

However, present operating systems and applications typically use a uniform set of accessibility characteristics across all graphical displays, whether they represent portions of a desktop, or show the same desktop. In some instances, a computer system user with limited visual acuity may need to view the same desktop or the same application output screen as another user having differing visual acuity. While each user may have their own monitor, using present technology, the settings of the desktop or application would have to be changed for both users in order to accommodate the user with limited visual acuity.

Therefore, it would be desirable to provide a multi-display computer system and method for providing differing graphical display accessibility feature selections on separate graphical displays that are displaying the same information.

SUMMARY OF THE INVENTION

The objective of providing differing accessibility feature selection in an multi-display environment is achieved in a computer system and method. The method is a method of operation of the computer system and may be embodied in program instructions stored in memory or on a storage media for carrying out the steps of the method when executed by one or more processors within the computer system.

The computer system includes at least two graphical displays displaying the same program output displays, but having differing accessibility feature set selections. The differing program output displays can be generated by an application program that is aware of the multiple displays and their corresponding accessibility settings. Alternatively, the output for each display device be generated by an operating system that is aware of accessibility settings for each display device and generates the output from a single program output information set provided by an application or another operating system component in conformity with the different accessibility and other display settings.

The application or operating system may first detect whether or not multi-display support is enabled, and generate display output in conformity a default set of accessibility settings if multi-display support is not enabled. The multiple graphical display devices may be a personal display of a presenter and a presentation projector, so that a presenter with limited visual acuity can be provided with an accessible display, while the presentation projector displays the presentation with the desired presentation characteristics.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a methodology and programs for providing accessible graphical display output from a computer system to a user having limited visual acuity, while providing another simultaneous graphical display output with a different set of accessibility features, or with a "standard" feature set. Users having different visual preferences or needs can thereby simultaneously view the same information. Also, if a presentation projector is used, the presenter's display can be provided with enhanced accessibility without affecting the presentation output.

Figure 1:
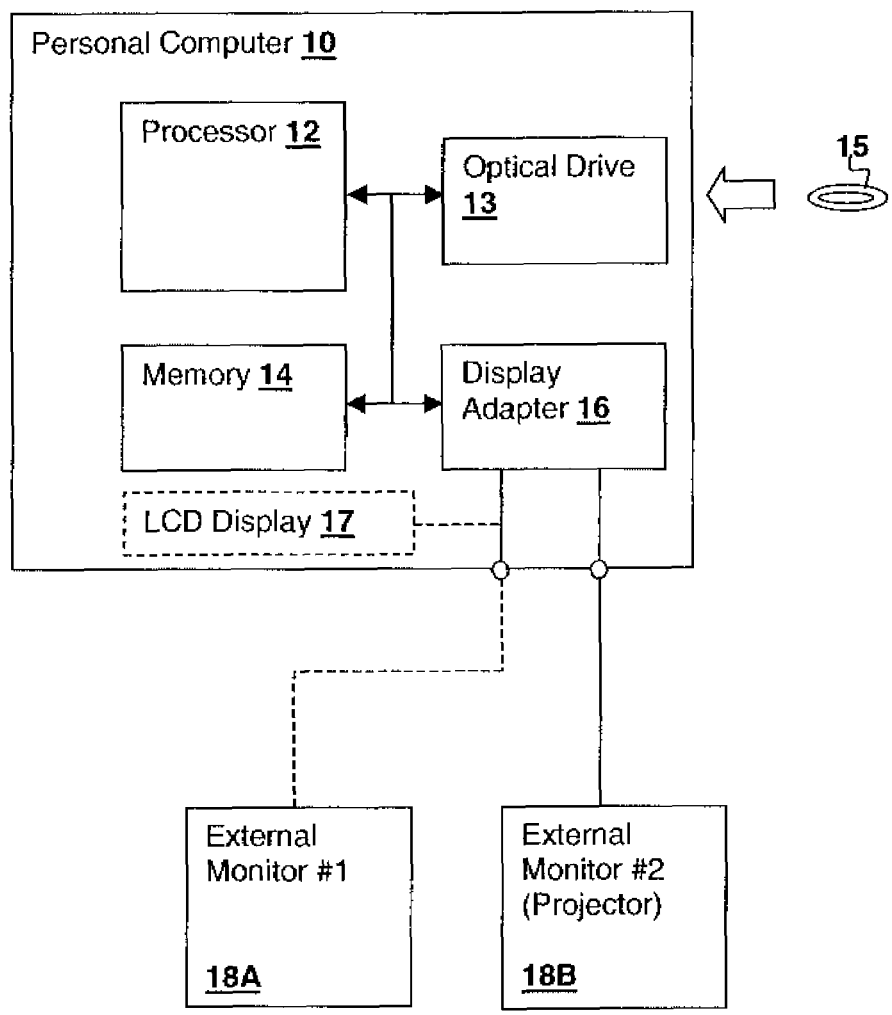
FIG. 1 is a block diagram of a computer system in which an embodiment of the present invention can be practiced.

With reference now to the figures, and in particular with reference to FIG. 1, there is depicted a block diagram of a personal computer system 10 in accordance with an embodiment of the present invention. Personal computer 10 may be a notebook computer, or a workstation and includes a processor 12, coupled to a memory 14 for storing program instructions for execution by processor and data values manipulated by the program instructions. An optical drive 13 is coupled to processor 12 and memory 14 for reading optical media 15, including computer program products comprising program instructions in accordance with embodiments of the present invention. Processor 12 and memory 14 are also coupled to a display adapter 16 that supports multiple graphical displays. Alternatively, multiple display adapters 16 may be provided to support each of multiple graphical display outputs.

If personal computer system 10 is a notebook computer, one of the graphical displays may be an internal liquid crystal display (LCD) 17 or other suitable integrated display type and a second external monitor 18B, which may be a projector, is attached by an analog or digital video display connector, such as a video graphics array (VGA) connector or digital visual interface (DVI) connector. If personal computer system 10 is a workstation computer, displays 18A and 18B will generally both be external display devices, such as external LCD monitors. External monitor 18B may be a projector, such as a presentation projector having a VGA or DVI input connection.

Figure 2:
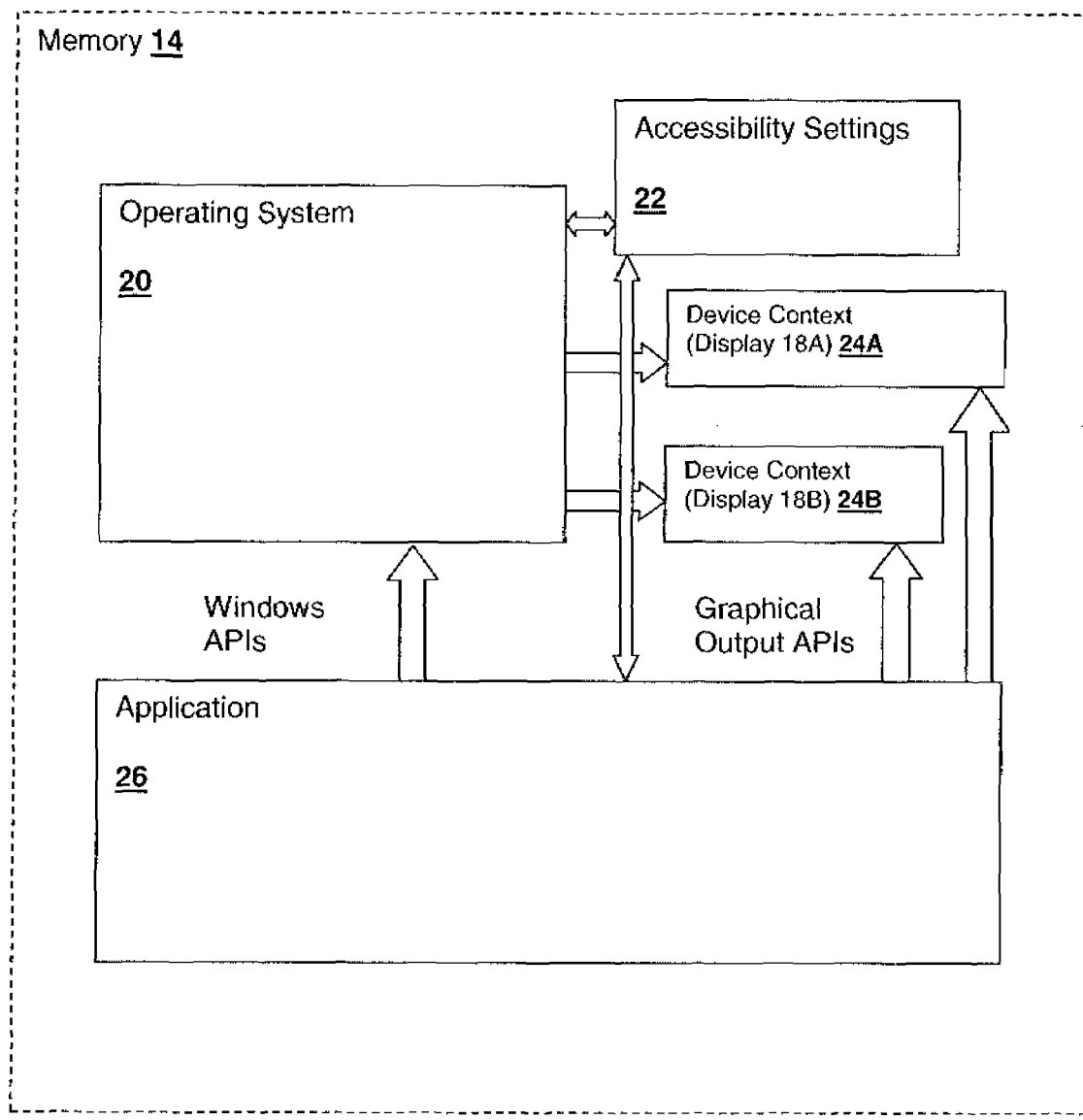
FIG. 2 is an illustration showing an arrangement of program instruction modules in memory of the computer system of FIG. 1.

Referring now to FIG. 2, an organization of software within memory 14 is shown to illustrate various embodiments of the present invention. An operating system 20 manages one or more applications 26, which may be "application" components of operating system 20, as well. In one embodiment of the present invention, an application 26 generates multiple graphical display outputs in conformity with accessibility settings 22 stored in memory 14 and provides those outputs to the corresponding graphical display devices. Generally, operating system 20 will provide the application programming interfaces (APIs) that support output to the various graphical display devices, APIs that can be used by application 26 to query display device characteristics, the number of display devices connected and other device-specific information. For example, in the illustration, operating system 20 provides device context 24A and 24B when the corresponding graphical display devices 18A and 18B are requested for output by application 26. Device contexts 24A and 24B abstract display devices 18A and 18B so that application 26 can generate graphical display output to display devices 18A and 18B in a device-independent manner.

However, in one embodiment of the invention, application 26 uses accessibility settings 22 associated with each of display devices 18A and 18B, so that when a non-default accessibility feature set is selected for one or both of display devices 18A and 18B, application 26 generates different output for device context 24A than for device context 24B, so that the accessibility features are reflected in the resultant program output as displayed on display devices 18A and 18B. Since application program 26 has access to graphical output APIs that set color, draw shapes and text, application program 26 has the ability to generate different output to each device context 24A, 24B.

Alternatively, in accordance with another embodiment of the present invention, operating system 20 may abstract display devices 18A and 18B to include the accessibility settings 22 in the operation of device contexts 24A and 24B, so that application 26 can provide a single program output to operating system 20 (or write the same program output to device contexts 24A and 24B) and operating system 22 then generates the display output provided to display devices 18A and 18B, so that selected accessibility settings 22 are reflected in the resulting program output as displayed on display devices 18A and 18B.

While present operating systems provide for differing display resolutions, sizes and color palette depth, they do not provide for selection of different user preferences for each monitor such as different color sets, contrast settings, and selection of font size relative to the display resolution. The present invention, either by action of application 26 directly and distinctly upon each device context 24A, 24B, or by action of an improved operating system 20 that includes in the device context specification the selection of such accessibility features on a per-display-device basis, provides for complete control of display device accessibility selection for each display device in the system. Selection of the accessibility settings may be via a control panel or selection pane provided by application 26, or via extension to the graphical display selection generally provided by an operating system 20 desktop control panel. For example, in WINDOWS (a product of Microsoft Corporation), the desktop graphical display device settings can be modified to include a separate tab for each monitor for font sizes, color schemes, wallpaper, contrast and other settings that affect the accessibility of the visual display and that are not part of the standard settable display characteristics (i.e., color plane bit depth and screen resolution).

Figure 3:
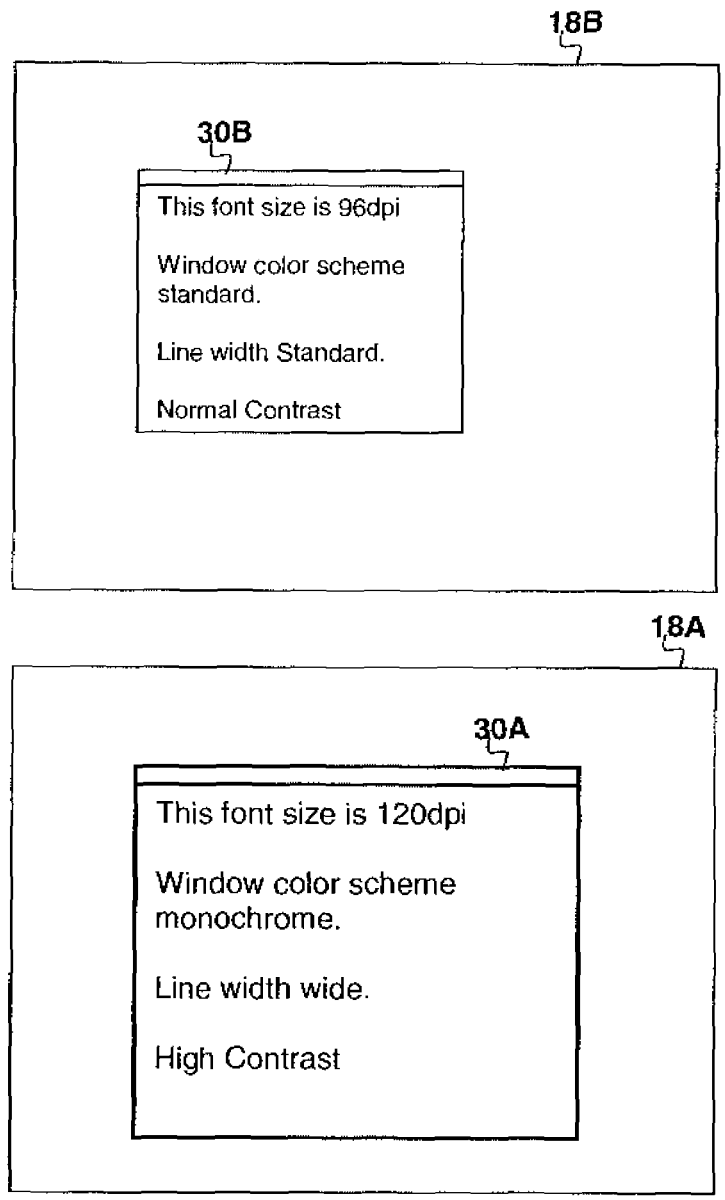
FIG. 3 is an illustration showing graphical output of a computer system in accordance with an embodiment of the present invention.

Referring now to FIG. 3, a pair of display device 18A, 18B screens are shown, with the same program output displayed with differing accessibility features selected in accordance with an embodiment of the present invention as windows 30A and 30B. Display device 18B has an associated default set of accessibility features selected, such as a 96 dpi font size, standard windows color scheme, standard line widths for window frames, etc., and a normal contrast mode. Display device has an associated set of different accessibility features selected, such as Large fonts of 120 dpi size, a monochrome color scheme, wide line width for window frames, etc., and a high contrast mode. Table I, below, lists accessibility features that can be made selectable and possible selection values.

TABLE I

| Accessibility Feature | Selection Values |
| --- | --- |
| Color scheme | Standard, Monochrome, color sets designed for specific color distinction impairments |
| Contrast | Standard or High contrast |
| Font Size | Selectable 64–240 dpi |
| Line width | Standard or Thick |

In the exemplary embodiment in which display device 18B may be a projector, program output 30A can provide an accessible display to a presenter having a degree of visual impairment, while the audience for the presentation sees a projection according to program output 30B having the desired color and other display characteristics.

Figure 4:
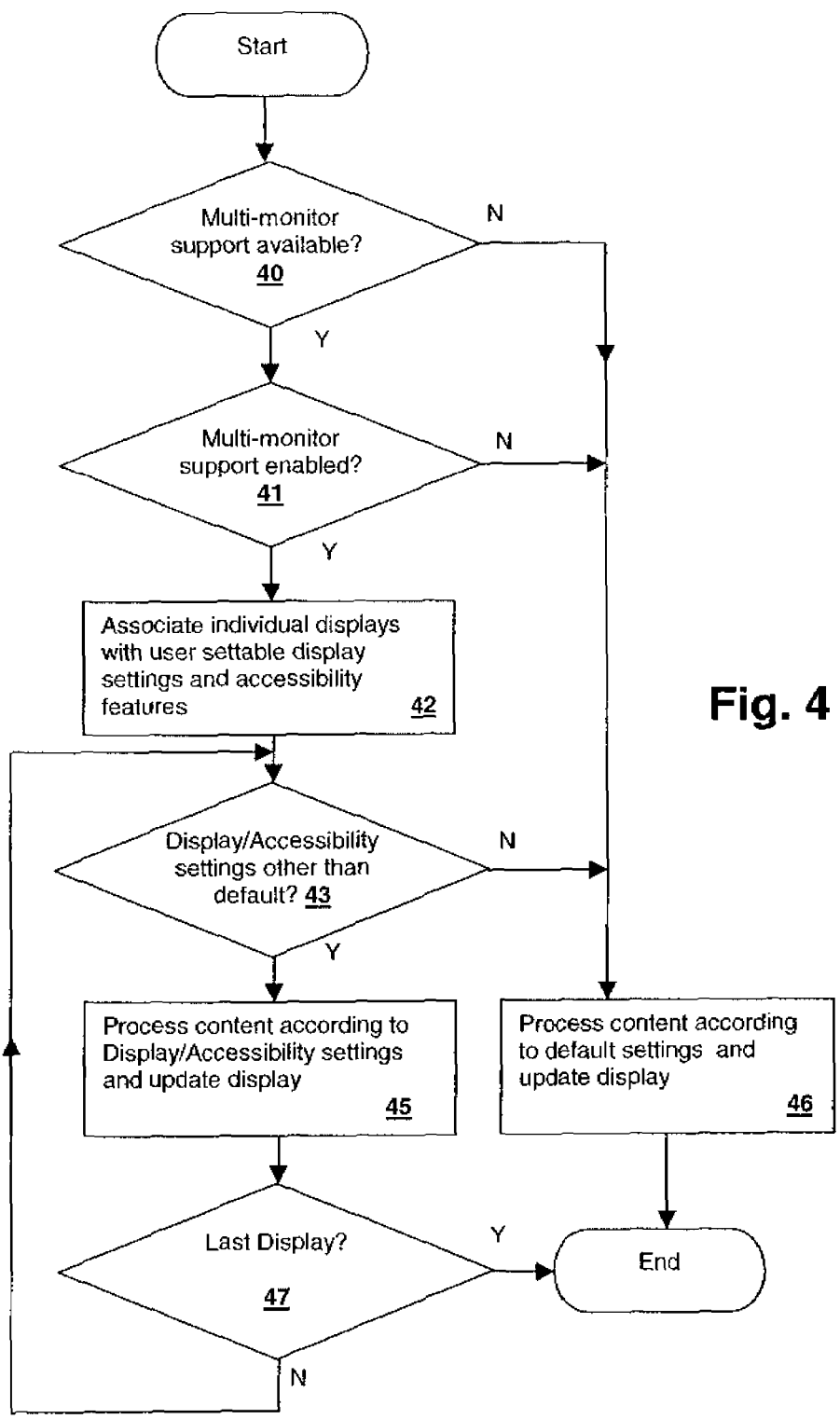
FIG. 4 is a flowchart depicting a method in accordance with an embodiment of the present invention.

Referring now to FIG. 4, a method in accordance with an embodiment of the present invention is shown in a flowchart. First, if multi-monitor support is not available (decision 40) or not enabled (decision 41), then the program output content is processed according to the default monitor settings and displayed (step 46). Otherwise if multi-monitor support is available (decision 40) and enabled (decision 41), then the program output content is processed for each display separately. Each display is associated with user settable display settings and accessibility features (step 42) and if the settings/features are other than the default (decision 43), then the program output content is processed according to the settings/features (step 45) for each display and the display is generated. The processing is repeated for each display until the last display has been updated (step 47). If any of the displays are set to the default settings and features, then the content is processed according to the default settings (step 46).

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A computer-performed method for providing program output having separately selectable accessibility features for each graphical display device of a computer system supporting multiple display devices, comprising:
    first reading a first set of accessibility settings from a memory of said computer system corresponding to a first graphical display device;
    second reading a second set of accessibility settings from a memory of said computer system corresponding to a second graphical display device;

first generating first graphical output for display on said first graphical display device in accordance with program output information and in conformity with a first desktop color scheme or a first contrast setting stored in said first set of accessibility settings;

second generating second graphical output for display on said second graphical display device in accordance with said program output information and in conformity with a second desktop color scheme or a second contrast setting stored in said second set of accessibility settings, wherein the second graphical output is identical to the first graphical output excepting differences between the first and second desktop color scheme and differences between the first and second contrast settings;

first displaying said first graphical output on said first graphical display device; and second displaying said second graphical output on said second graphical display device, simultaneous with said first displaying, whereby the same program output information is displayed with different accessibility settings on the first and second graphical display devices.

2. The computer-performed method of claim 1, wherein said first generating and said second generating are performed by an application program managed by an operating system of said computer system.

3. The computer-performed method of claim 1, wherein said first generating and said second generating are performed by an operating system of said computer system.

4. The computer-performed method of claim 3, wherein said first reading and said second reading read separate sets of desktop settings, whereby a first set of desktop settings is specified for a first user viewing said first graphical display device and a second set of desktop settings is specified for a second user viewing said second graphical display device.

5. The computer-performed method of claim 3, further comprising providing said program output information set from an application managed by said operating system, wherein said first reading and said second reading are performed by said operating system, and wherein said first and second generating are performed by said operating system.

6. The computer-performed method of claim 1, further comprising determining whether or not multi-display support is enabled on said computer system, wherein in response to determining that said multi-display support is not enabled, said first reading reads a default set of accessibility settings, and wherein said second generating and said second displaying are performed only in response to determining that said multi-display support is enabled.

7. The computer-performed method of claim 1, wherein said first graphical display device is a personal computer display and said second display is a presentation projector display, whereby a presenter having limited visual acuity is provided with an accessible graphical user interface while a presentation made to an audience is provided with a different set of display characteristics.

8. A computer system including a memory for storing program instructions and data, a processor for executing said program instructions, a first graphical display device and a second graphical display device, wherein said program instructions comprise program instructions for providing separate accessibility features for each of said first and second graphical display devices, said program instructions comprising:

first reading a first set of accessibility settings from a memory of said computer system corresponding to said first graphical display device;

second reading a second set of accessibility settings from a memory of said computer system corresponding to said second graphical display device;

first generating first graphical output for display on said first graphical display device in accordance with program output information and in conformity with a first desktop color scheme or a first contrast setting stored in said first set of accessibility settings;

second generating second graphical output for display on said second graphical display device in accordance with said program output information and in conformity with a second desktop color scheme or a second contrast setting stored in said second set of accessibility settings, wherein the second graphical output is identical to the first graphical output excepting differences between the first and second desktop color scheme and differences between the first and second contrast settings;

first displaying said first graphical output on said first graphical display device; and second displaying said second graphical output on said second graphical display device, simultaneous with said first displaying, whereby the same program output information is displayed with different accessibility settings on the first and second graphical display devices.

9. The computer system of claim 8, wherein said program instructions for first generating and second generating comprise program instructions within an application program managed by an operating system of said computer system.

10. The computer system of claim 8, wherein said program instructions for first generating and second generating comprise program instructions within an operating system of said computer system.

11. The computer system of claim 10, wherein said program instructions for first reading and second reading read separate sets of desktop settings, whereby a first set of desktop settings is specified for a first user viewing said first graphical display device and a second set of desktop settings is specified for a second user viewing said second graphical display device.

12. The computer system of claim 10, further comprising program instructions, within an application program managed by said operating system, for providing said program output information set, and wherein said program instructions for first reading, second reading, first generating and second generating are program instructions of said operating system.

13. The computer system of claim 8, further comprising program instructions for determining whether or not multi-display support is enabled on said computer system, wherein in response to determining that said multi-display support is not enabled, said program instructions for first reading read a default set of accessibility settings, and wherein said program instructions for second generating and said second displaying are executed only in response to determining that said multi-display support is enabled.

14. The computer system of claim 8, wherein said first graphical display device is a personal computer display and said second display is a presentation projector display, whereby a presenter having limited visual acuity is provided with an accessible graphical user interface while a presentation made to an audience is provided with a different set of display characteristics.

15. A computer program product, comprising a computer readable storage medium encoding program instructions for execution within a general-purpose computer system, wherein said program instructions comprise program instructions for providing separate accessibility features in a graphical display system of a computer system, said program instructions comprising:

first generating first graphical output for display on a first graphical display device in accordance with a program output information and in conformity with a first desktop color scheme or a first contrast setting stored in a first set of accessibility settings;

second generating second graphical output for display on said second graphical display device in accordance with said program output information and in conformity with a second desktop color scheme or a second contrast setting stored in said second set of accessibility settings, wherein the second graphical output is identical to the first graphical output excepting differences between the first and second desktop color scheme and differences between the first and second contrast settings;

first displaying said first graphical output on said first graphical display device; and second displaying said second graphical output on said second graphical display device, simultaneous with said first displaying, whereby the same program output information is displayed with different accessibility settings on the first and second graphical display devices.

16. The computer program product of claim 15, wherein said program instructions are program instructions of an operating system for operating said general-purpose computer system.

17. The computer program product of system of claim 16, wherein said program instructions further comprise program instructions for receiving said program output information set from an application program.

18. The computer program product of claim 16, wherein said program instructions of said operating system further comprise program instructions for generating said program output information set.

19. The computer program product of claim 15, further comprising program instructions for:

determining whether or not multi-display support is enabled on said computer system; and in response to determining that said multi-display support is not enabled reading a default set of accessibility settings, and wherein said program instructions for performing second generating and said second displaying are executed only in response to determining that said multi-display support is enabled.

20. A computer program product, comprising a computer readable storage medium encoding program instructions for execution within a general-purpose computer system, wherein said program instructions comprise application program instructions for generating two graphical display outputs on separate first and second graphical display devices of said computer system to provide separate accessibility features on each of said graphical display devices, said program instructions comprising:

first reading a first set of accessibility settings from a memory of said computer system corresponding to said first graphical display device;

second reading a second set of accessibility settings from a memory of said computer system corresponding to said second graphical display device;

first generating first graphical output for display on said first graphical display device in accordance with program output information and in conformity with a first desktop color scheme or a first contrast setting stored in said first set of accessibility settings; and second generating second graphical output for display on said second graphical display device in accordance with said program output information and in conformity with a second desktop color scheme or a second contrast setting stored in said second set of accessibility settings, wherein the second graphical output is identical to the first graphical output excepting differences between the first and second desktop color scheme and differences between the first and second contrast settings, whereby the same program output information is represented with different accessibility settings in the first and second graphical output.

* * * * *